United States Patent
Caveney et al.

(10) Patent No.: US 9,065,658 B2
(45) Date of Patent: Jun. 23, 2015

(54) PHYSICAL LAYER MANAGEMENT SYSTEM

(75) Inventors: Jack E. Caveney, North Palm Beach, FL (US); Ronald A. Nordin, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 302 days.

(21) Appl. No.: 13/379,532

(22) PCT Filed: Jun. 25, 2010

(86) PCT No.: PCT/US2010/039965
§ 371 (c)(1),
(2), (4) Date: Jan. 31, 2012

(87) PCT Pub. No.: WO2010/151749
PCT Pub. Date: Dec. 29, 2010

(65) Prior Publication Data
US 2012/0134366 A1 May 31, 2012

Related U.S. Application Data

(60) Provisional application No. 61/220,817, filed on Jun. 26, 2009.

(51) Int. Cl.
*H04L 12/28* (2006.01)
*H04L 12/10* (2006.01)
*H04L 12/24* (2006.01)
*H04L 12/26* (2006.01)
*H04Q 1/02* (2006.01)

(52) U.S. Cl.
CPC .............. *H04L 12/10* (2013.01); *H04L 12/24* (2013.01); *H04L 41/00* (2013.01); *H04L 43/0811* (2013.01); *H04Q 1/138* (2013.01)

(58) Field of Classification Search
CPC ....................................................... H04L 12/24
USPC ......... 370/252–253, 208–210, 440–465, 516; 375/257–260
See application file for complete search history.

(56) References Cited

U.S. PATENT DOCUMENTS

2004/0001430 A1* 1/2004 Gardner ........................ 370/210
2004/0233928 A1* 11/2004 Pozsgay ........................ 370/446

(Continued)

FOREIGN PATENT DOCUMENTS

WO WO 2004/105317 A1 12/2004

OTHER PUBLICATIONS

"3Com Intellijack Switch NJ240FX", User Guide, 3COM, Mar. 31, 2005.

(Continued)

*Primary Examiner* — Iqbal Zaidi
(74) *Attorney, Agent, or Firm* — Christopher S. Clancy; Yuri Astvatsaturov

(57) ABSTRACT

An Ethernet outlet senses the presence of an Ethernet signal and transmits an Ethernet ID signal in response to the restoration of an Ethernet signal that was interrupted. The sensing circuit is designed to have no detrimental effect on Ethernet signals. Using this system, the locations of Ethernet outlets and network endpoint devices connected to the outlets can be determined following the interruption and reestablishment of network communications. Outlets according to the present invention can be used in copper-based networks or in networks having fiber optic components.

9 Claims, 8 Drawing Sheets

(56) References Cited

U.S. PATENT DOCUMENTS

2007/0039035 A1* 2/2007 Magin .......................... 725/127
2007/0058732 A1* 3/2007 Riedel et al. ................. 375/257
2007/0250616 A1* 10/2007 Morelli et al. ............... 709/223
2012/0068830 A1* 3/2012 Caveney et al. ............ 340/10.2

OTHER PUBLICATIONS

"Failsafe Biasing of Differential Buses" Announcement National Semiconductor, Jan. 1, 1998.

\* cited by examiner

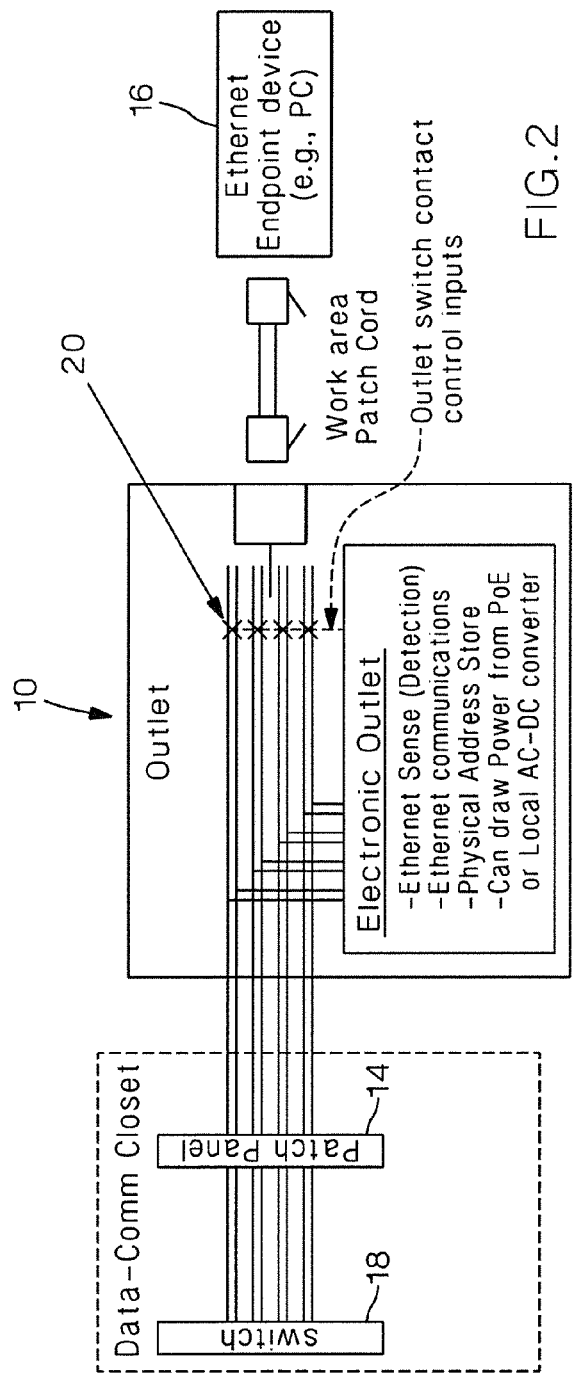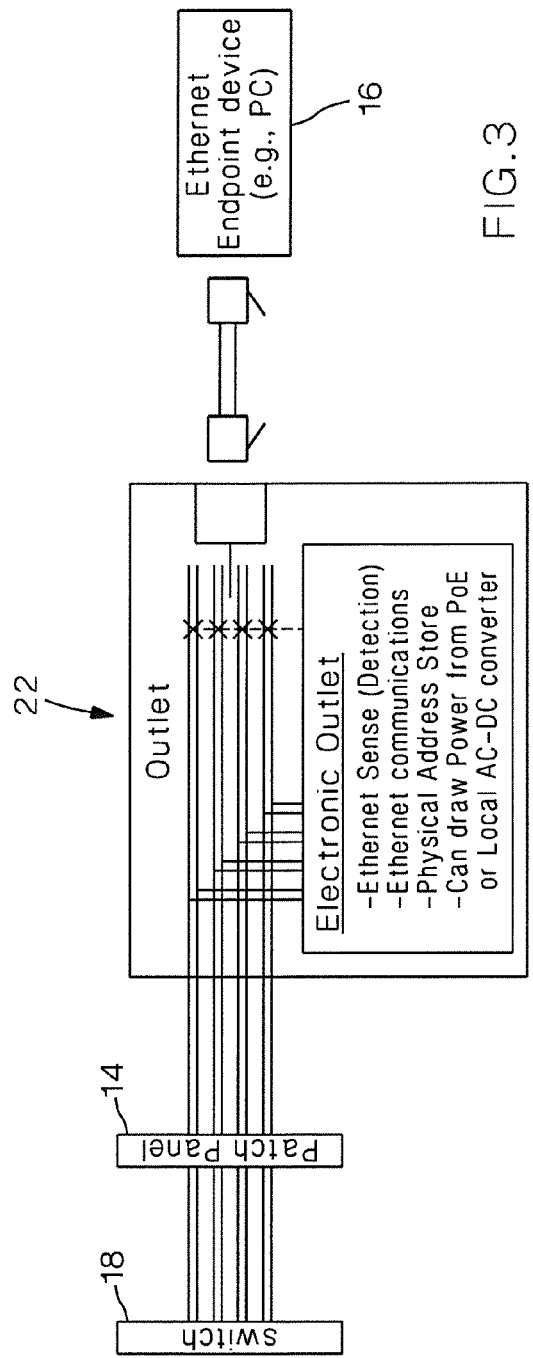

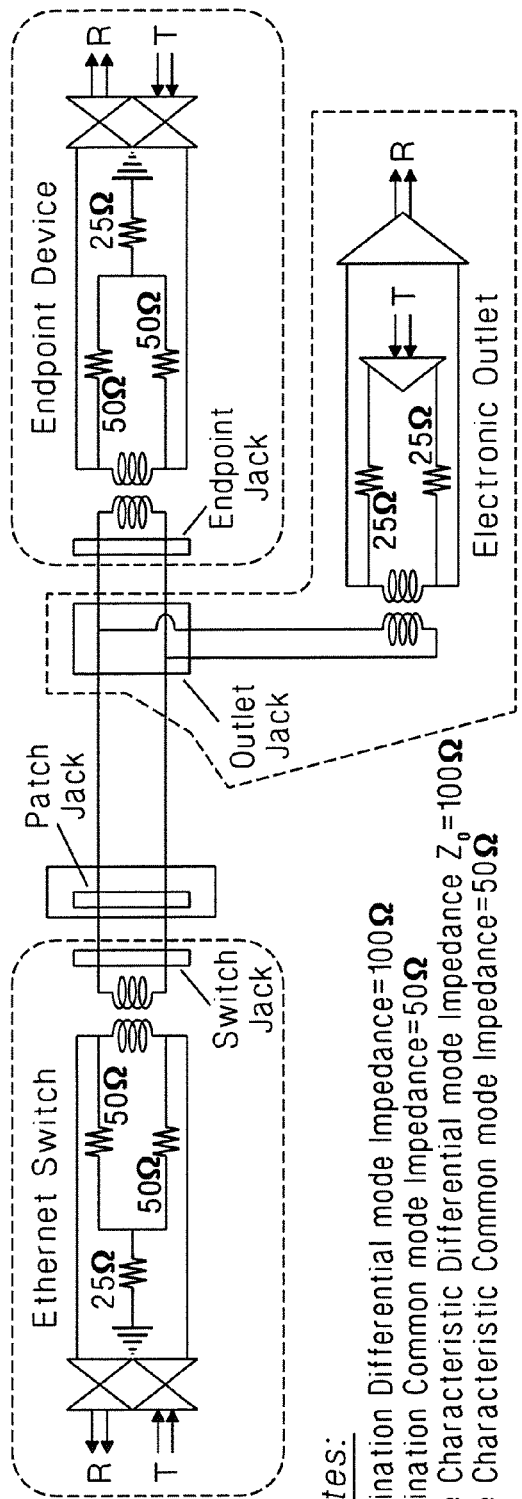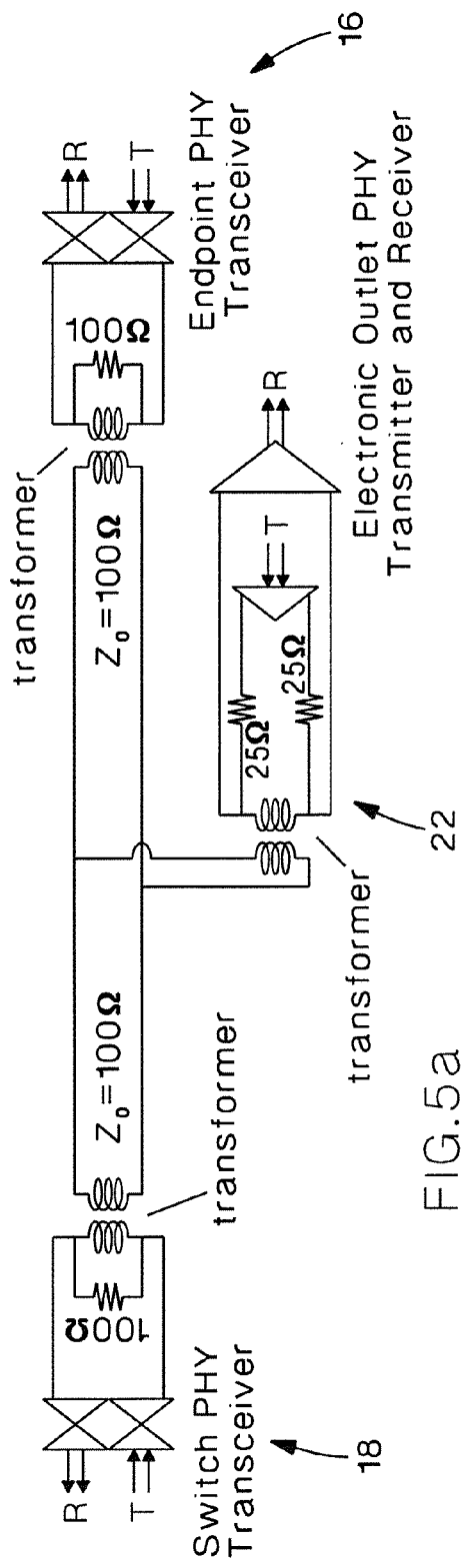
FIG.5a

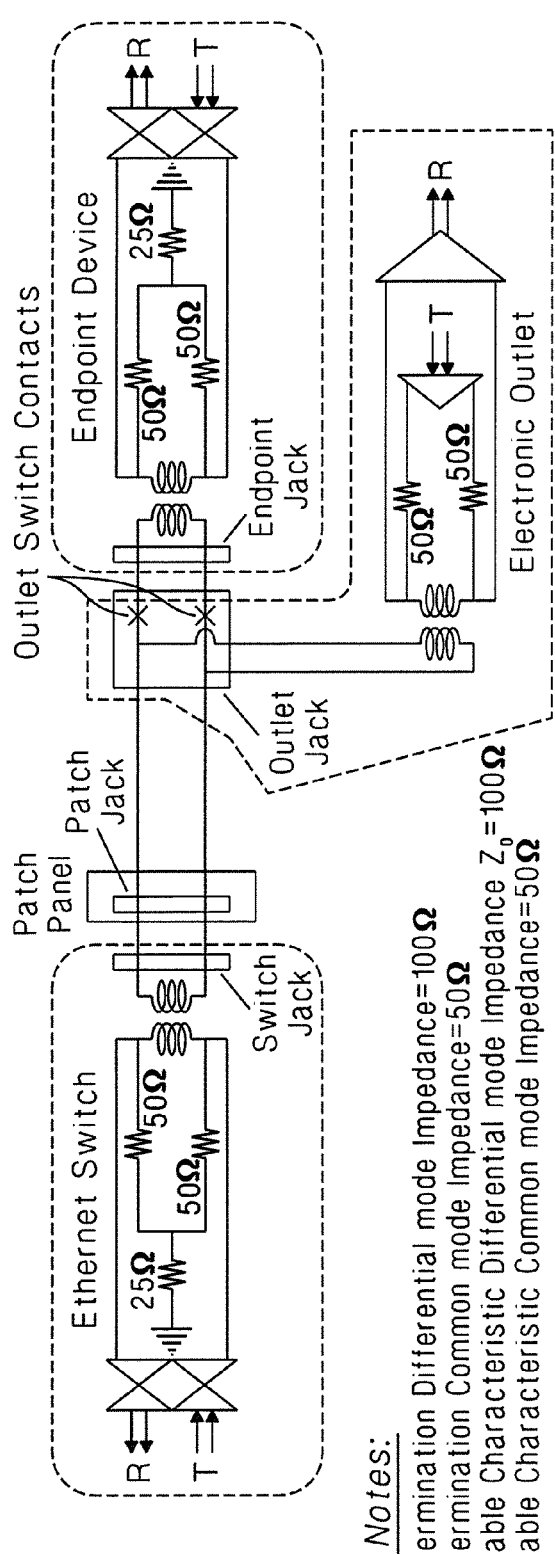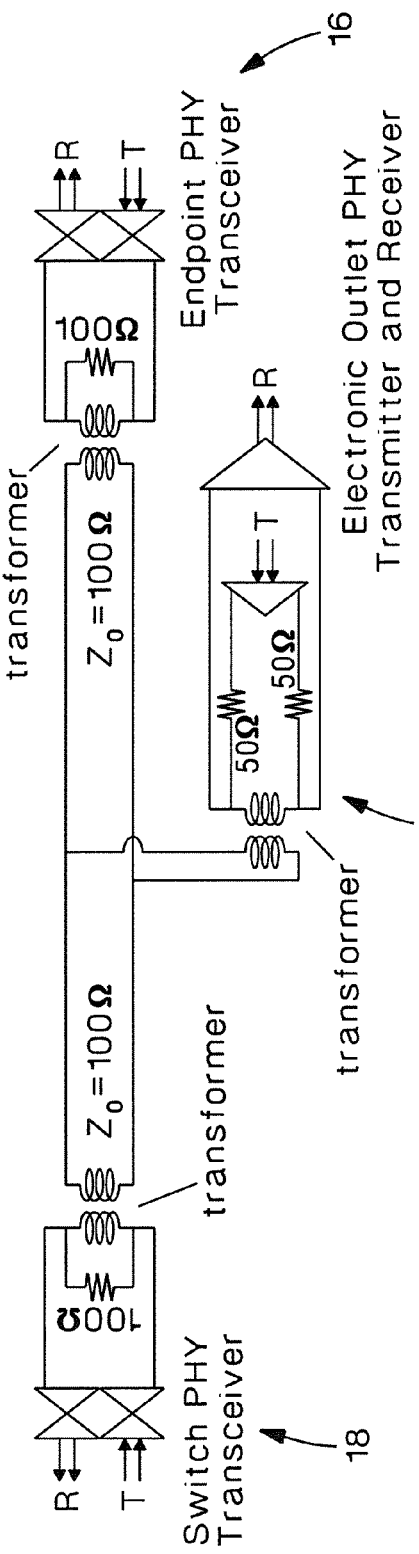
FIG.5b

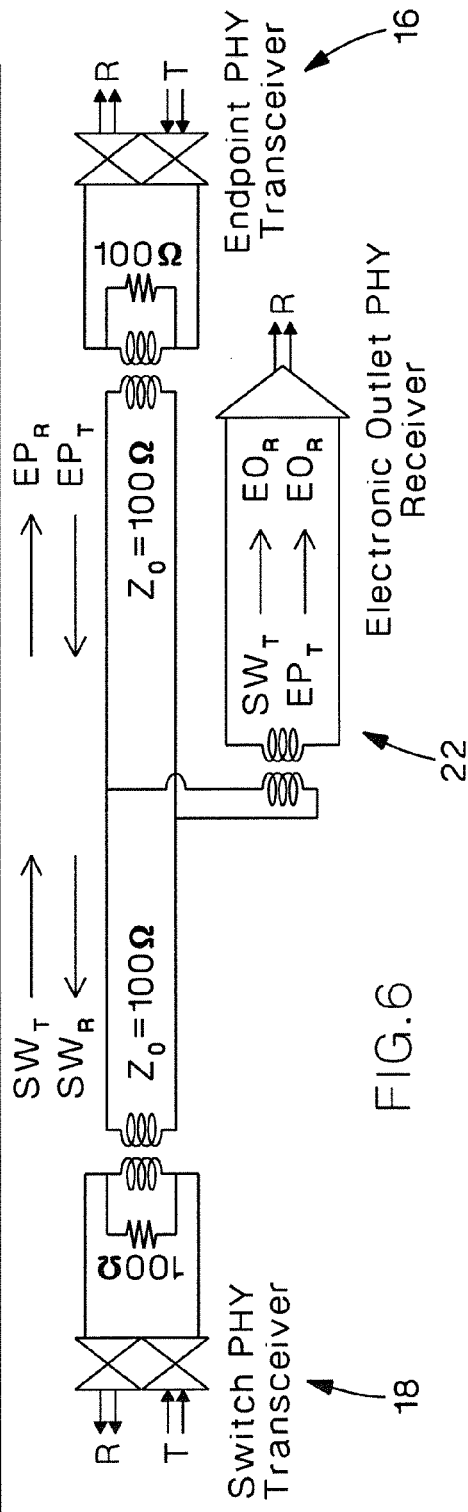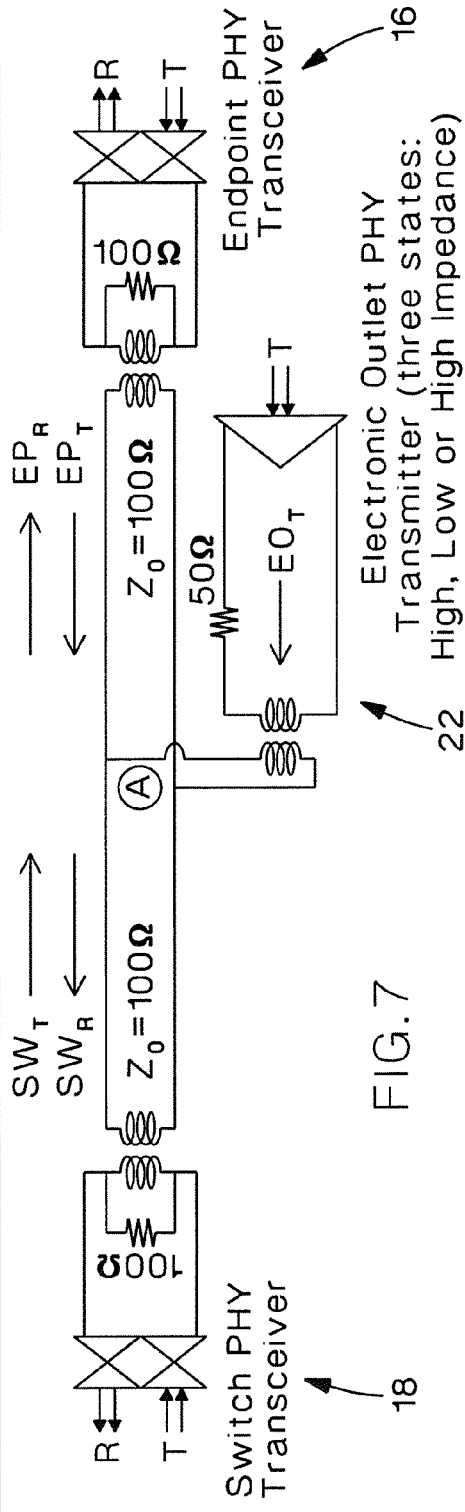

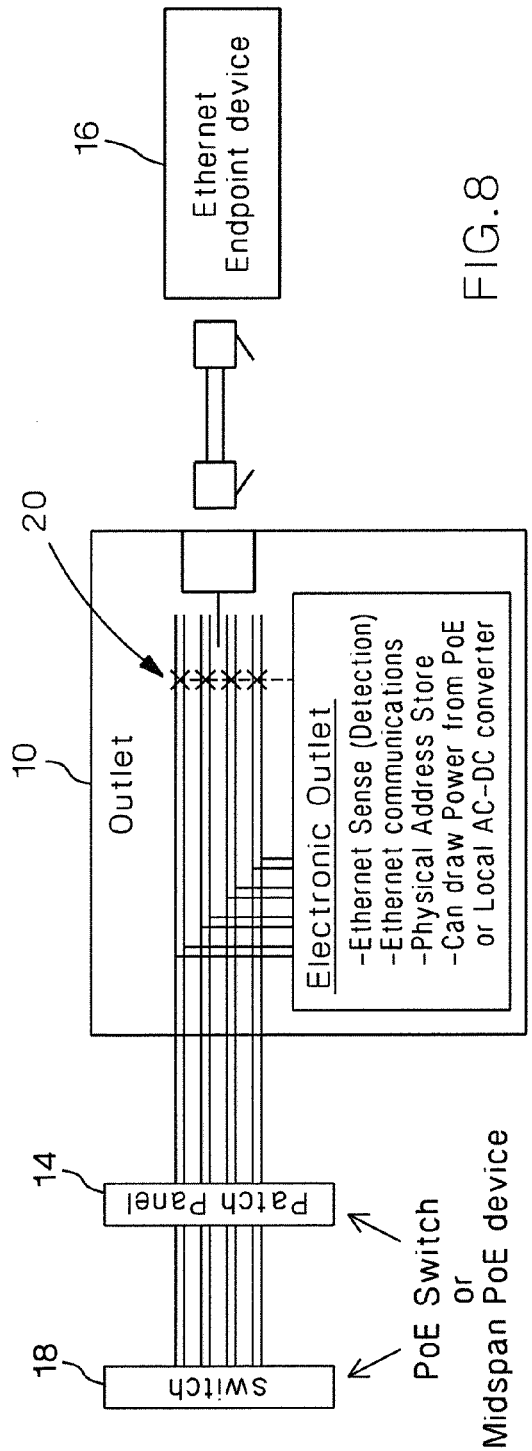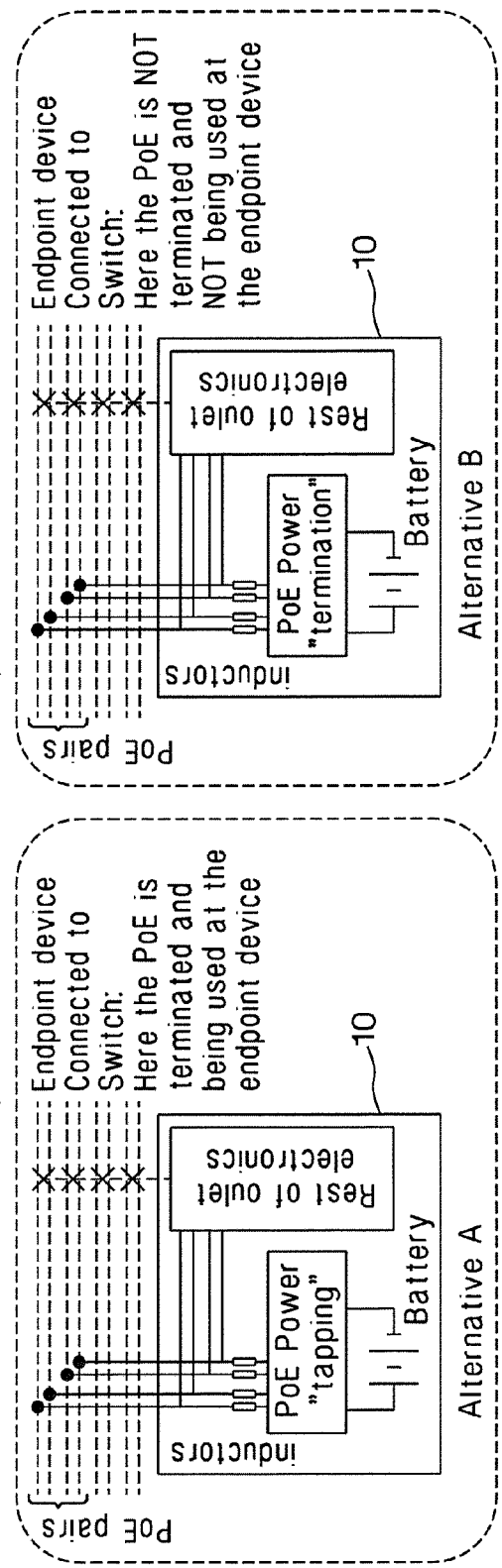
FIG.8

PHYSICAL LAYER MANAGEMENT SYSTEM

BACKGROUND OF THE INVENTION

Physical layer management systems are of growing interest in the industry today due to the growing size and complexity of communication networks. These systems provide automatic documentation of the physical layer and assist in providing guidance for moves, adds, and/or changes (MAC's) to the network. Traditionally, these networks have only included a physical layer management system that manages cross-connect patch fields or interconnect patch field configurations. Having a physical layer management system that extends from the switch port through the patch field and to the outlet would be a more preferred system.

BRIEF DESCRIPTION OF THE DRAWINGS

FIG. 2 is a schematic diagram showing elements of a physical layer management system according to one embodiment of the present invention;

FIG. 3 is a schematic diagram showing elements of a physical layer management system according to another embodiment of the present invention;

FIG. 5a is an electrical circuit diagram of elements in a physical layer management system according to one embodiment of the present invention, showing differential mode signaling;

FIG. 5b is an electrical circuit diagram of elements in a physical layer management system according to another embodiment of the present invention, showing differential mode signaling;

FIG. 6 is an electrical circuit diagram of elements in a physical layer management system according to one embodiment of the present invention, showing differential mode signaling with an electronic outlet in a receive mode;

FIG. 7 is an electrical circuit diagram of elements in a physical layer management system according to one embodiment of the present invention, showing differential mode signaling with an electronic outlet in a transmit mode;

FIG. 8 illustrates the use of Power over Ethernet to power an electronic outlet.

DETAILED DESCRIPTION OF THE ILLUSTRATED EMBODIMENTS

The applicable Ethernet specifications, (i.e., IEEE802.3), require that, at data rates of 1 Gbps and higher, a compliant Ethernet device (i.e., an Ethernet switch and an endpoint device) switch must continuously send transmit packets while it is receiving transmit packets from an Ethernet device. Here both the Ethernet switch and the endpoint device will be transmitting packets continuously when they are connected together. This is useful in the determination of whether or not a device is connected to a particular Ethernet port. That is, if there are Ethernet packets being transmitted (from the Ethernet switch and the endpoint device), the endpoint device must be connected.

In embodiments of the present invention, an electronic outlet circuit detects transmit packets from the switch to determine when packet transmission has started or when an interruption has occurred. Following the initiation of transmission, and also after an interruption, an outlet circuit transmits the outlet ID (representing the physical location of the outlet) to a Network Management System (NMS) via the switch. The NMS can determine which switch port the outlet ID Ethernet packet was received on (via the transmitted Ethernet packet). It also can determine the identity (i.e., MAC address) of the connected destination device since the destination device's transmit packets will contain its identity. The outlet ID, which represents the physical location of the outlet, can be stored in non-volatile memory within the electronic outlet or the ID can be read from an RFID chip using an antenna connected to the electronic outlet circuit. The RFID chip can be located within or near the outlet (e.g., mounted on the outlet box). The ID can be configured (i.e., written-to) at the time the outlet is installed or later, for example via the NMS at system initialization.

Figure 1:
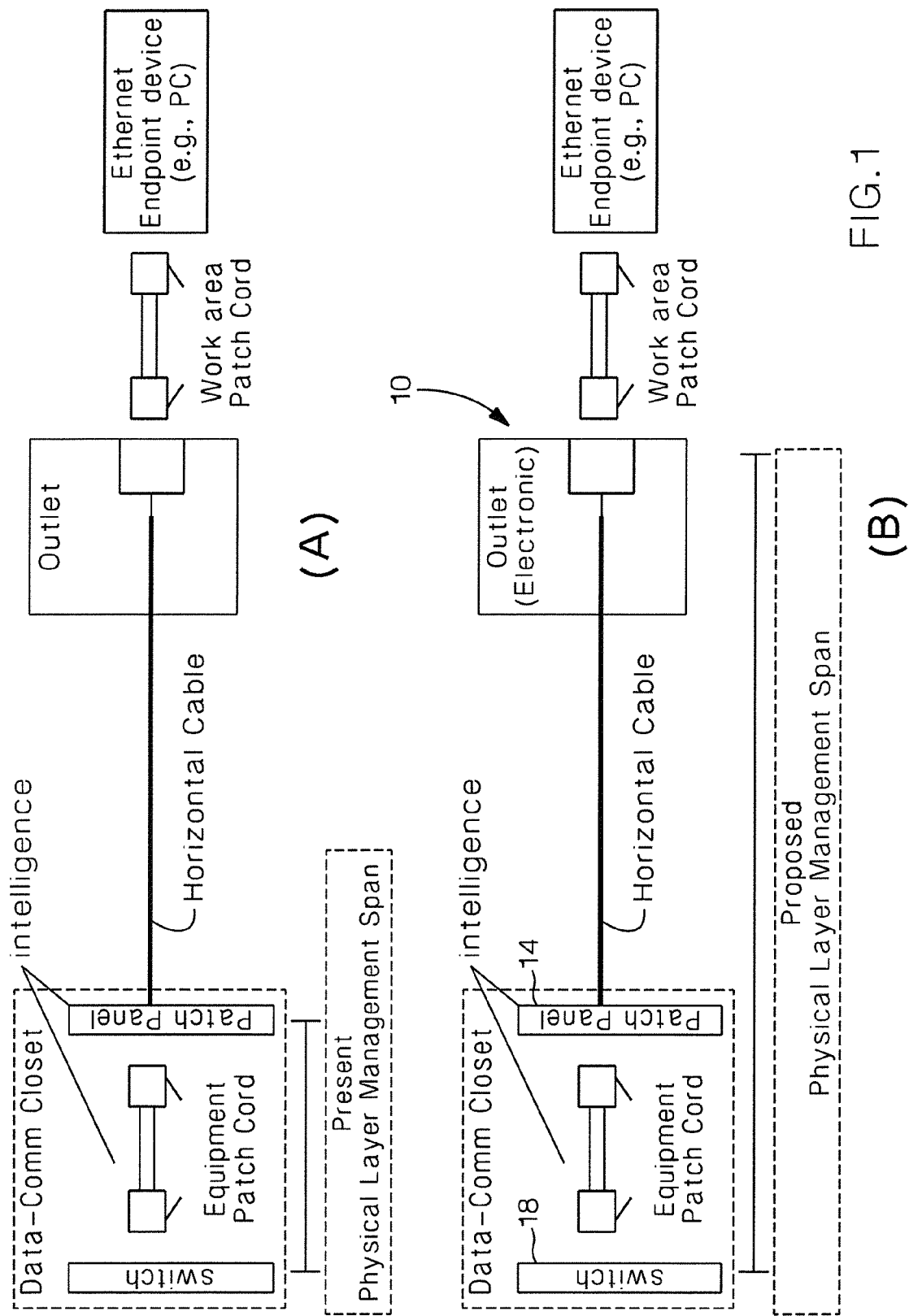
FIG. 1(A) is a schematic view of a prior art physical layer management system.
FIG. 1(B) is a schematic view of a physical layer management system according to one embodiment of the present invention.

FIG. 1(A) shows the current state of the art for the span of a physical layer management system. Many products monitor and manage the patch field in the data communications closets for enterprise LANs. These products can determine the physical locations of endpoints only through the software (or database) assignment of the horizontal cable endpoint (i.e., the outlet) to a physical location. If the horizontal cable is moved, either at the data communications closet or at the outlet jack, this correlation of the horizontal cable endpoint to a physical location is broken. Hence there is a need in the industry for an intelligent (i.e., electronic) outlet 10 (as shown in FIG. 1(B)) that can store an ID or information about a physical location and communicate with the physical layer network management system. In this construction, the location information regarding the horizontal cable end point is controlled (or determined) by the outlet and not by a preset relationship between the connectors in the patch panel 14 and the outlets.

FIG. 2 shows a first embodiment of the electronic outlet 10. It utilizes high-bandwidth switches 20 in order to isolate the endpoint device 16 during intervals when the electronic outlet 10 is communicating to the network manager via the Ethernet switch 18. The reason this is important is that Ethernet is generally a point-to-point communication technique and all endpoints are interconnected and terminated in impedances of 100 Ω. Hence if there are two endpoint devices, each of which is terminated in 100 Ω, a large reflection will occur at the point where the endpoints are connected together. This will make communications difficult if not impossible. The electronic outlet 10 preferably has the capabilities of: traffic detection, for determining when there is Ethernet traffic occurring on the cabling; receiving and transmitting Ethernet communications; storing an ID and/or physical location information in non-volatile memory; using power from PoE or from a local AC source; and controlling the high-bandwidth switches 20.

When the electronic outlet 10 senses the first presence of Ethernet traffic from the Ethernet switch 18, the high-bandwidth switches 20 are opened and the electronic outlet 10 communicates with the Ethernet switch 18 (by first requesting an IP address). Once an IP address has been established, the electronic outlet 10 communicates to the Network Management System (NMS), which is connected to the switch 18, and reports its physical address and/or ID to the NMS. The electronic outlet 10 also reports to the NMS that a connection has been established between the Ethernet switch 18 and the endpoint device 16. Once this information is transmitted successfully, the electronic outlet 10 releases its communications with the Ethernet switch 18 and closes the high-bandwidth switches 20 to allow the endpoint device 16 to re-establish Ethernet communications. (Note that idle Ethernet frames are continuously transmitted in 1000 Mbs and higher Ethernet systems.) When no Ethernet traffic from the Ethernet switch 18 occurs for a set amount of time (e.g., as fast as reasonably possible, for example less than 100 ms) the electronic outlet 10 will open the high-bandwidth switches 20 and communicate back to the NMS again to report that a disconnection occurred. The electronic outlet 10 will then close the high-bandwidth switches 20 and begin to respond as it did above when Ethernet traffic resumes.

Figure 9:
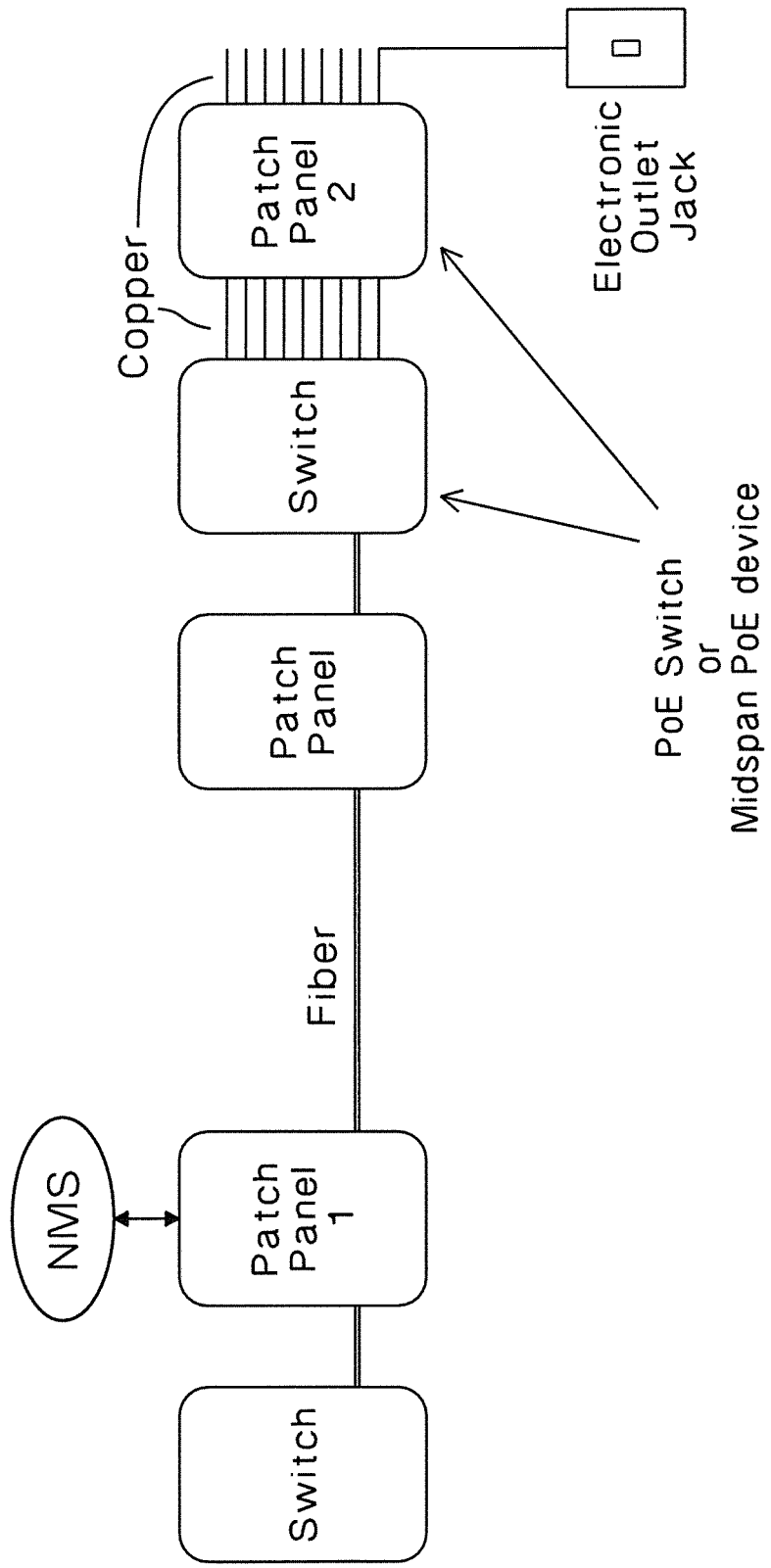
FIG. 9 is a block diagram showing the integration of a physical layer management system into a fiber optic network.

This technique works under all copper based network configurations as well as with hybrid fiber/copper networks as shown in FIG. 9.

FIG. 3 shows an electronic outlet 22 of a second embodiment. In this embodiment the high bandwidth switches are not used. This may be advantageous to lower the cost and complexity of the implementation. The capabilities of the electronic outlet 22 are similar to those of the first embodiment, described above. The termination impedance of the electronic outlet 22 is different than the first embodiment due to the 100 Ω environment that it must be compatible with. Here, the transmit termination impedance of the electronic outlet 22 must be 50 ohm when it is transmitting and high impedance when it is not (i.e., when it is in a receive mode). The transmit termination impedance of the outlet must be 50 Ω because the 100 Ω impedances of the switch 18 and the endpoint device 16 are in parallel with respect to the outlet 22. Hence the signal from the outlet 22 will split evenly to the switch 18 and endpoint device 16 without a reflection that would have occurred if the electronic outlet 22 had a different transmit termination impedance. The termination in the "receive" mode must be high impedance to avoid reflections when the switch 18 is transmitting (i.e., when the outlet 22 is in the receive mode).

Electronic outlets according to embodiments of the present invention carry out a signaling function when the following events occur: (a) when an endpoint device is connected to or disconnected from the electronic outlet 22; (b) when the NMS requests information from the electronic outlet 22; (c) when there is an interruption in communications between the Ethernet switch and the electronic outlet 22 and the communication is re-established.

Figure 4:
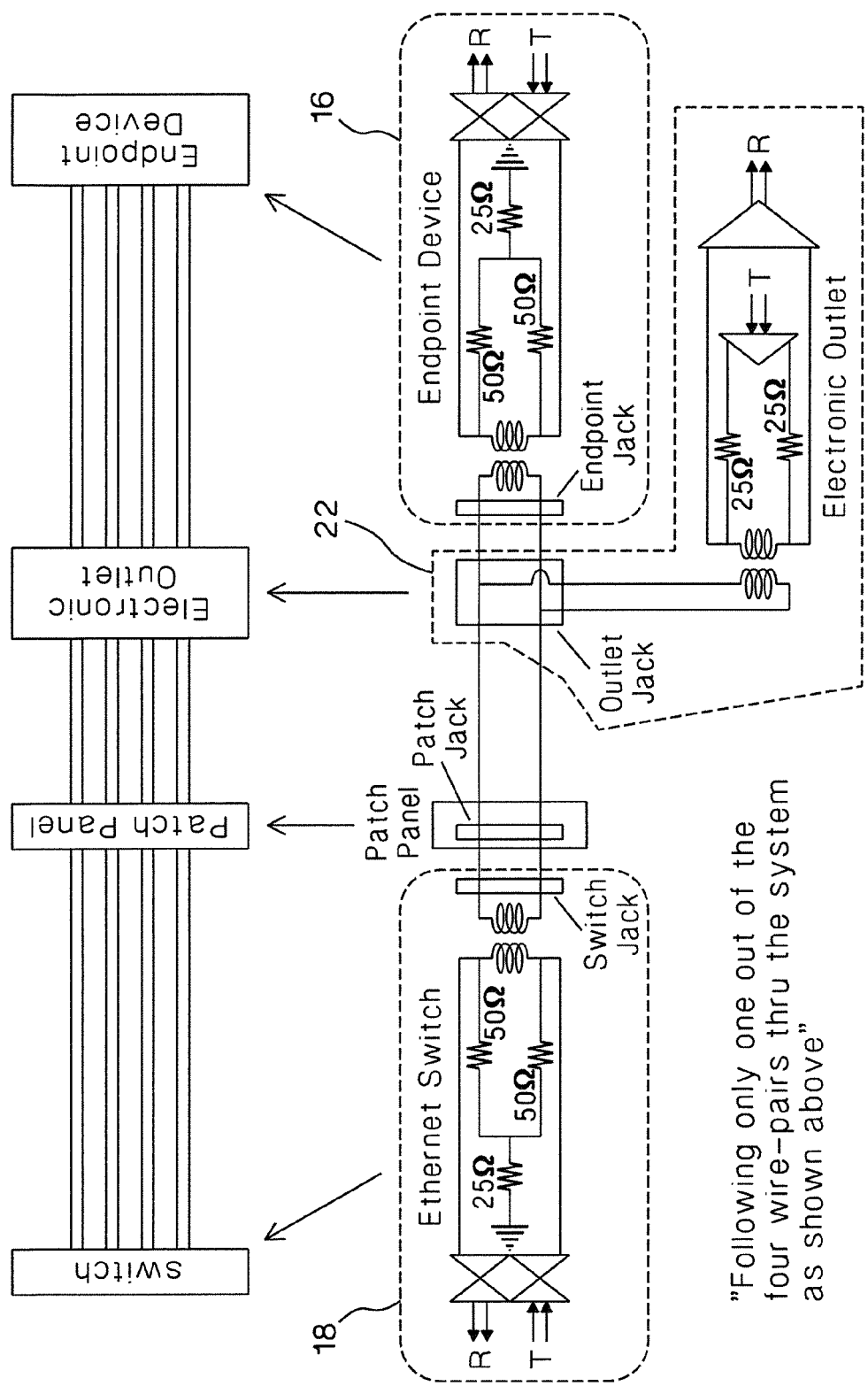
FIG. 4 is a schematic diagram showing impedances of elements in a physical layer management system according to one embodiment of the present invention.

FIG. 4 shows an electronic schematic representation of the electronic outlet 22, as well as schematic representations of the Ethernet switch 18 and endpoint device 16. Here one can see the 100 Ω characteristic impedance of the cabling and the 100 Ω termination impedances of the Ethernet switch 18 and endpoint device 16. When both the Ethernet switch and the endpoint device are interconnected, the impedance as seen by the electronic outlet is 50 Ω. Hence when the electronic outlet wants to communicate to the Network Management System (NMS) via the Ethernet Switch, its impedance should be set to 50 Ω to avoid any reflections. FIG. 4 shows a schematic representation of only one wire-pair; the schematic is repeated three more times to implement a four-pair Ethernet communication system.

FIGS. 5a and 5b show in more detail the equivalent electrical differential signal diagrams of embodiments of the present system. FIG. 6 illustrates from the electronic outlet perspective, the receive-only mode as it applies to the electronic outlets 10 and 22 of the first and second embodiments discussed above. FIG. 7 illustrates the transmit-only mode of the electronic outlet 22 of the second embodiment.

Electronic Outlet Receive Mode

This is the state the electronic outlet normally is in. Here the electronic outlet 22 "listens" to transmit packets from either the Ethernet switch 18 or the endpoint device 16. It can determine which device (either the switch or the endpoint in this case) sent an Ethernet packet by reading the packet header. Note that the outlet has a high impedance as seen by either the Ethernet switch 18 or the endpoint device 16 so that it will not interfere with normal Ethernet traffic between the switch and the endpoint device.

Preferably, the only times that the electronic outlet should change states from this receive mode to the transmit mode are: when the endpoint device is installed and Ethernet packets are transmitted to request an IP address from the DHCP server; or after an interruption and after restoration of Ethernet packets from the Ethernet switch.

When the electronic outlet changes state to the transmit state, it will do so only for a short time, and then return back to a receive-only state. Note that the receiver is always active regardless of the state that the electronic outlet is in.

Electronic Outlet Transmit Mode

The transmit state of the electronic outlet 22, as shown in FIG. 7, is a temporary state, in that once a message (representing the change of the connectivity of the endpoint device along with the ID) is sent from the outlet, the transmitter essentially goes into a high impedance state—which is in essence is the defined receive state. Note that the transmitted packet (from the outlet) will go to the Ethernet switch 18 and the endpoint device 16. The endpoint device 16 ignores all these packets since they will not be directed to it. The electronic outlet should restrict or limit the amount of data transmitted to minimize the amount of time that the transmitter is active on the communication path. This will help to minimize packet collisions.

Since this configuration, utilizing the electronic outlet 22, contains three transmitters on an active communication path, there is a small possibility of packet collision. This packet collision could occur, for example, when the endpoint device or the Ethernet switch attempts to transmit an Ethernet packet during the same time that the electronic outlet is transmitting an Ethernet packet. Hence the electronic outlet 22 must perform packet collision-detection and prevention. The outlet 22 can detect a collision when it cannot correctly read a packet transmitted to it, due to either the Ethernet switch or the endpoint device sending a packet concurrently with the outlet sending a packet. When a collision occurs, the outlet must back-off attempting to re-transmit packets until a certain amount of time has elapsed. This time will vary dependent upon network traffic. Preferably, the electronic outlet 22 only communicates to the switch during a physical layer change (meaning quite rarely) and the amount of time that it is actually transmitting a packet is short in duration. Hence the probability of a packet collision is quite small.

When the electronic outlet 22 activates the transmitter, the path from the outlet to the Ethernet switch 18 or endpoint device 16 is impedance-matched and no signal reflections will occur in the system. However, the path from the Ethernet switch or endpoint device towards the outlet is impedance-mismatched which will result in signal reflections where the outlet connects to the communication path (point A in FIG. 7). This impedance mismatch further aggravates the packet collision situation described above.

The electronic outlet 10 as illustrated in FIG. 5b uses high-bandwidth switches to remove the endpoint device 16 from the communication path when the electronic outlet 10 transmits signals to the Ethernet switch 18. Thus, the problems of impedance mismatch as described with respect to the transmission mode of the electronic outlet 22 are avoided.

FIG. 8 illustrates how an electronic outlet can utilize power from either a PoE-based Ethernet Switch or a midspan device (e.g., a patch panel or a midspan PoE device located between the Ethernet switch 18 and the patch panel). The examples show an electronic outlet 10 of the first embodiment, which has high-bandwidth switches 20, but these powering schemes can be used with an electronic outlet that does not have the switches 20. In alternative A, the electronic outlet 10 simply "taps" a small amount of power (less than 0.75 W) from the PoE power that is destined for the endpoint device 16. Here of course, the endpoint device 16 is connected to the Ethernet switch 18 and drawing power from the PoE source. This small amount of power (i.e., less than 0.75 W) would not affect the endpoint device 16. In alternative B, the PoE power is terminated at the electronic outlet itself. In this case the endpoint device may or may not be powered by the Ethernet switch. In both cases a rechargeable battery (or a large capacitor) could be used to send packets to the NMS system if PoE power to the outlet is interrupted for any reason. The electronic outlet can use inductors to connect to the horizontal cable so that the AC impedance seen into the power section of the outlet remains at a large value. The batteries may be exclusively used to power the electronic outlet, with power from PoE being utilized to periodically re-charge the batteries.

FIG. 9 shows a fiber optic network that employs a copper-based portion, where an electronic outlet according to the present invention can be located.

The invention claimed is:

1. A system for identifying connections in a communication network having an Ethernet switch and a network management system, said system comprising:
  a plurality of electronic outlets, each of said electronic outlets including a communication path providing a connection between said Ethernet switch and an endpoint device, each of said electronic outlets being connected to said Ethernet switch via a first plurality of wire pairs and further connected to an endpoint device via a second plurality of wire pairs, each of said electronic outlets storing identification information in memory and having a transmit mode and a receive mode,
  wherein a termination impedance measured along said communication path of said electronic outlet includes a first termination impedance when said electronic outlet is in said transmit mode and a second termination impedance when electronic outlet is in said receive mode, said first and said second termination impedances being different.

2. The system of claim 1 wherein said identification information comprises an ID number.

3. The system of claim 1 wherein said identification information comprises information regarding the physical location of the electronic outlet.

4. The system of claim 1 wherein said first termination impedance of said electronic outlet is 50 Ω.

5. The system of claim 4 wherein said second termination impedance of said electronic outlet is high impedance.

6. The system of claim 1 wherein each of said electronic outlets independently enters the receive mode when the endpoint device is first connected to the corresponding electronic outlet.

7. The system of claim 1 wherein each of said electronic outlets enters the receive mode after interruption and restoration of Ethernet packets sent toward the electronic outlets from the Ethernet switch.

8. The system of claim 1 wherein said electronic outlets are connected to said Ethernet switch via an intermediate device.

9. The system of claim 1, wherein each of said electronic outlets is positioned between said Ethernet switch and respective said endpoint device.

\* \* \* \* \*